C. A. NEARMAN.
WATER HEATER FOR SHAVING OUTFITS.
APPLICATION FILED MAR. 2, 1910.

1,030,526.

Patented June 25, 1912.

Inventor
Charles A. Nearman.

By Victor J. Evans
Attorney

Witnesses
William C. Linton.

UNITED STATES PATENT OFFICE.

CHARLES AUGUST NEARMAN, OF OAKLAND, CALIFORNIA.

WATER-HEATER FOR SHAVING OUTFITS.

1,030,526.        Specification of Letters Patent.      Patented June 25, 1912.

Application filed March 2, 1910. Serial No. 546,902.

*To all whom it may concern:*

Be it known that I, CHARLES A. NEARMAN, a citizen of the United States of America, residing at Oakland, in the county of Alameda and State of California, have invented new and useful Improvements in Water-Heaters for Shaving Outfits, of which the following is a specification.

This invention relates to shaving outfits, and one of the principal objects of the same is to provide a simple and convenient device for keeping the water hot for shaving and for providing means for supporting a mirror in position for use.

Another object of the invention is to provide a support for a candle and a stand for a water container above the candle to provide means for keeping the water hot during the shaving operation, means being also provided for supporting a mirror or glass in position for use, all the parts being packed within a box or casing to occupy but little space.

Still another object of the invention is to provide a convenient shaving outfit for travelers consisting of a stand for supporting a candle, a container for water supported upon the stand above the candle and a casing for containing the stand and container, said casing having a hinged bracket for supporting a mirror, said mirror being secured to a cap or cover for the casing.

These and other objects may be attained by means of the construction illustrated in the accompanying drawing, in which,—

Figure 1:
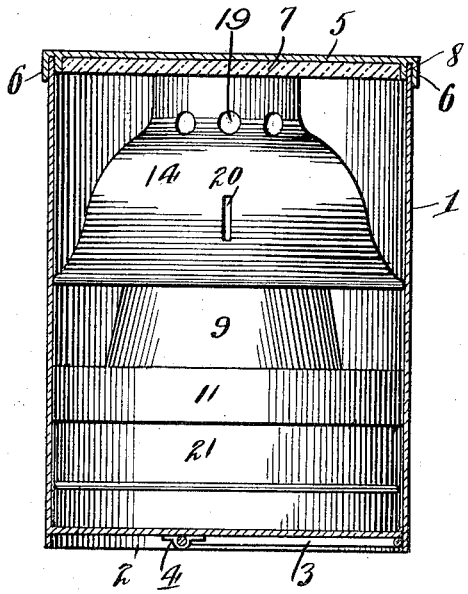
Figure 2:
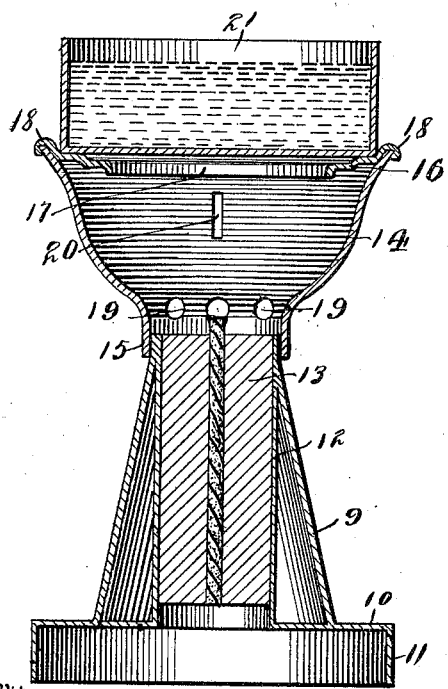
Figure 3:
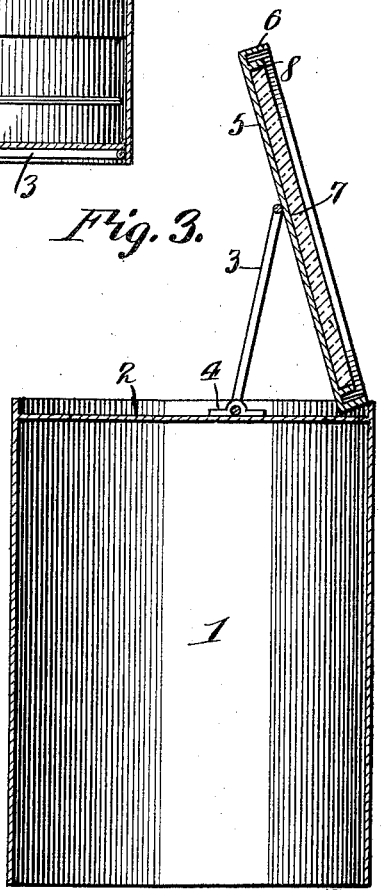

Figure 1 is a sectional view of a casing for containing the various parts of a shaving outfit, said parts being shown in elevation in the casing. Fig. 2 is a vertical section taken through the stand, the candle holder and the water container in position for use for keeping the water hot. Fig. 3 is a vertical sectional view showing the manner of supporting the mirror in position for use.

Referring to the drawing, the numeral 1 designates the casing designed to inclose the parts of the shaving outfit, said casing being open at its upper end and provided near its lower end with a bottom 2, said bottom being set a slight distance within the casing 1. This casing is preferably circular in cross section, but may be made of any desired shape. Secured to the bottom 2 is a wire bracket 3, said bracket being hinged to the keepers 4 and adapted to lie down against the bottom when not in use, as shown in Fig. 1. The cover 5 for the casing is provided with a down-turned outer flange 6, and connected to the inner side of the cover is a mirror or glass 7, said glass being held in place by an inner flange or suitable lugs 8, thus permitting the cover to be applied to the casing 1 with the body of the casing disposed between the outer flange 6 and the inner flange or lugs 8, as shown in Fig. 1.

Adapted to be packed within the casing 1 when not in use is a stand 9 provided with a base 10 having an annular downturned flange 11. The portion 9 of the stand tapers toward the upper end, and a candle holder or tube 12 is secured to the upper end of the portion 9 and formed integral with or secured to the base portion 10, as shown in Fig. 2. A candle 13 may be placed in the tube 12. A flaring support 14 is provided with a tubular lower end 15 adapted to engage the upper end of the candle holder and is provided at its upper end with a diaphragm 16 having a large central opening 17, said diaphragm being secured at its outer edge 18 to the upper edge of the flaring support 14, as shown in Fig. 2. The support 14 is provided with air holes 19 and 20. A water container 21 which is adapted to hold the shaving soap when the outfit is packed away is made of a size to rest upon the top of the support, and after the candle has been lighted, the water will be kept hot during the entire shaving operation.

The parts of the outfit are packed within the casing by first placing the water container 21 within the casing and placing at the top of the same the support 9, the base portion 11 serving as a cover for the water container. The flaring support 14 is inverted to fit over the candle holder, and then the cover and mirror are secured in place to close the casing 1, as shown in Fig. 1, the bracket 3 being thrown down upon the bottom 2 of the casing.

From the foregoing it will be obvious that a shaving outfit made in accordance with my invention can be readily packed within the casing to occupy but little space for placing the same in a traveling bag or suit case, can be readily unpacked and set up for use and will always keep the water hot during the shaving operation, while the cost of production of the outfit is but slight.

I claim:—

A shaving outfit comprising a base having a downwardly projecting flange, a candle holder extending over the base, a flaring support mounted upon the candle holder and having an apertured top and vented sides, a conical sleeve surrounding the candle holder and connected to the same adjacent the top thereof and to the base, and a water container removably mounted upon the top of the support, said base and flange adapted to act as a cover for said container and said support adapted to be inverted on the candle holder, the walls of the aperture fitting the conical sleeve.

In testimony whereof I affix my signature in presence of two witnesses.

CHARLES AUGUST NEARMAN.

Witnesses:
E. O. BODIN,
GUST. ALHN.

Copies of this patent may be obtained for five cents each, by addressing the "Commissioner of Patents, Washington, D. C."